United States Patent [19]

Fedeli

[11] 4,320,617
[45] Mar. 23, 1982

[54] STRUCTURE BLADE EFFECTIVE TO BE APPLIED TO ROTATING GRASS-CUTTING MACHINES

[76] Inventor: Luisa Fedeli, Via dei Gracchi, 26, 20100 - Milano, Italy

[21] Appl. No.: 109,660

[22] Filed: Jan. 4, 1980

[30] Foreign Application Priority Data

Jan. 15, 1979 [IT]  Italy ................................ 19286 A/79

[51] Int. Cl.³ ............................................ A01D 55/18
[52] U.S. Cl. ........................................ 56/295; 56/13.4
[58] Field of Search ................................ 56/295, 13.4

[56] References Cited

U.S. PATENT DOCUMENTS

| | | | |
|---|---|---|---|
| 2,203,198 | 6/1940 | Junge | 56/295 |
| 2,697,322 | 12/1954 | Watrous | 56/295 |
| 2,809,389 | 10/1957 | Collins et al. | 15/339 |
| 2,969,634 | 1/1961 | Lannert | 56/295 |
| 3,162,990 | 12/1964 | Cook | 56/295 |
| 3,191,371 | 6/1965 | Brewer | 56/295 |
| 3,399,519 | 9/1968 | Buchanan | 56/295 |
| 3,538,692 | 11/1970 | Cope et al. | 56/295 |
| 3,703,071 | 11/1972 | Anderson | 56/295 |
| 3,724,182 | 4/1973 | Long et al. | 56/295 |
| 4,031,694 | 6/1977 | Gobin | 56/202 |
| 4,121,405 | 10/1978 | Wolf | 56/295 |

*Primary Examiner*—Paul J. Hirsch
*Attorney, Agent, or Firm*—Bucknam and Archer

[57] ABSTRACT

A rotating grass-cutting machine blade is provided at each end with a projecting member which exercises a pushing action on the cut grass pieces so as to eject the cut grass towards a discharging port formed through the rotating grass-cutting machine casing and then into a collecting vessel. The projecting members may be perforated wall blades or may consist of a comb formed by removing material from a bent portion of the blade. Each projecting member may consist of a plurality of laminae which extend parallel with respect to the longitudinal axis of the blade or may consist of a plurality of cantilevered members.

1 Claim, 9 Drawing Figures

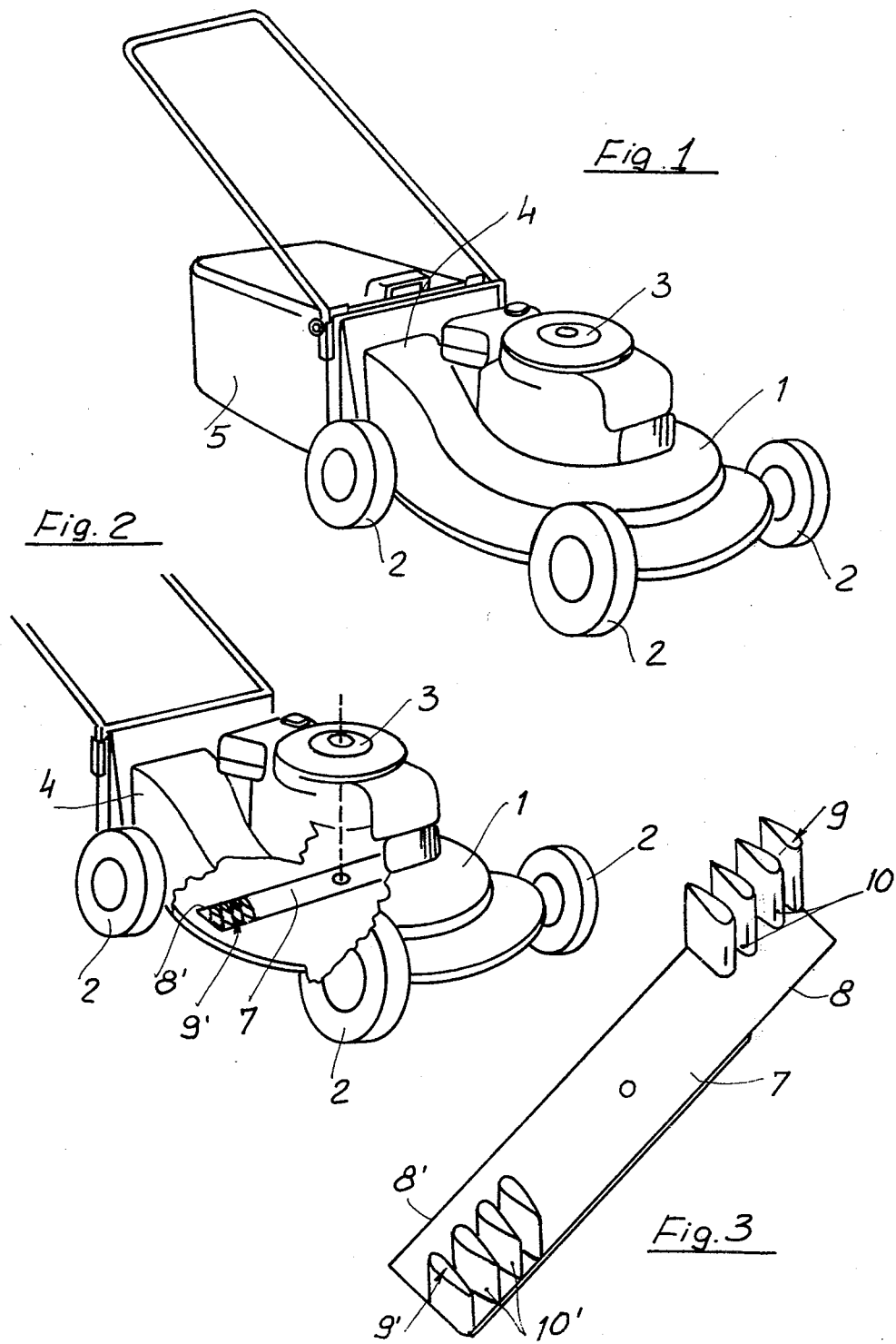

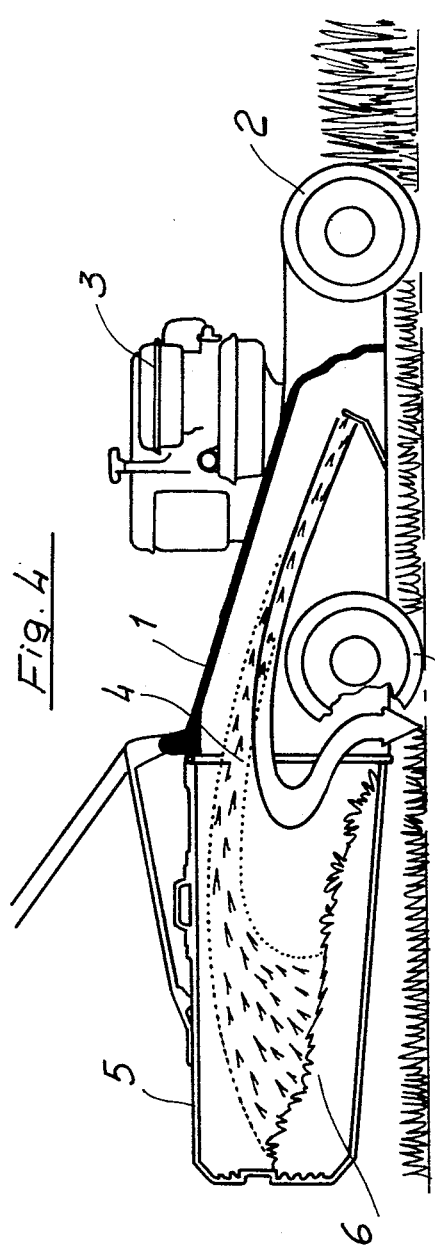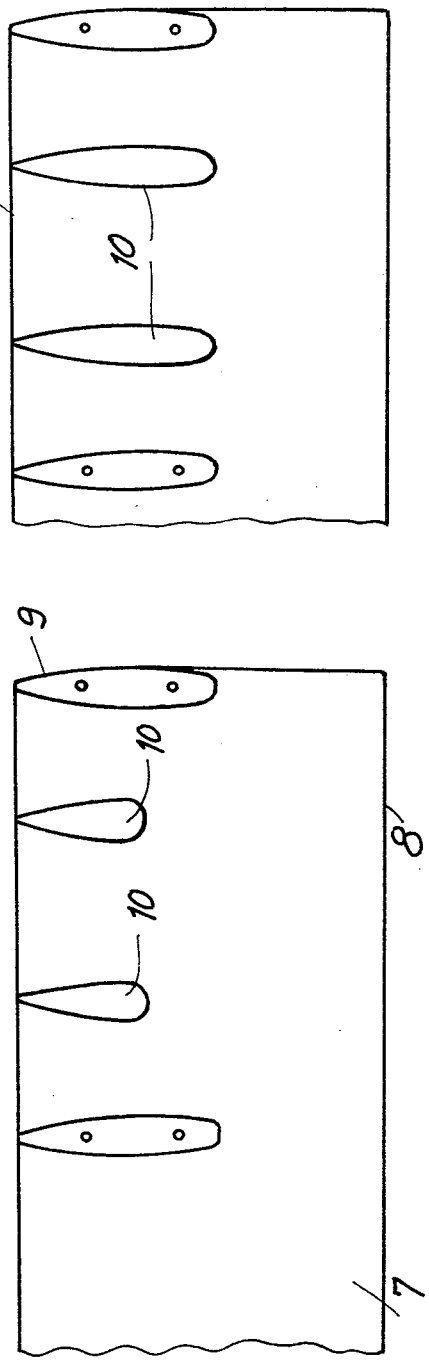

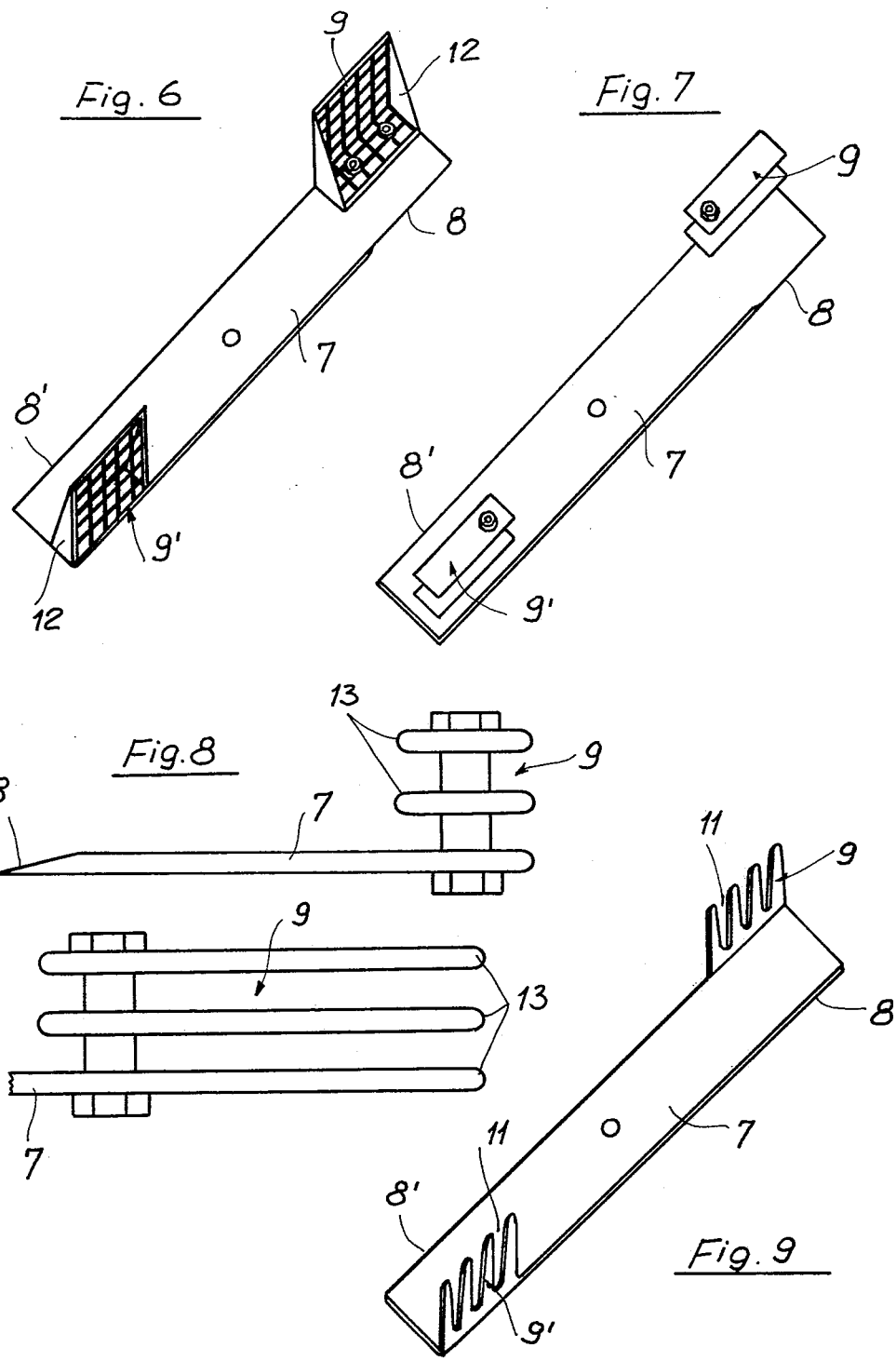

STRUCTURE BLADE EFFECTIVE TO BE APPLIED TO ROTATING GRASS-CUTTING MACHINES

The present invention relates to a single blade, for cutting machines, having a particularly improved structure.

As it is known, there are nowadays commercially available motor driven rotating grass-cutting machines, provided for cutting grass, for the maintenance of the grassy areas in gardens, parks, sports grounds and grass-grown zones either private or public in general.

These grass-cutting machines comprise, essentially, a casing made of metallic material or materials effective to resist against wear and shocks as produced by the movement of the cutting members.

In the foot-operator type of grass-cutting machines, in particular, the casing is provided with three or four wheels, or two rollers, or a wheel-roller combination, allowing for the machine to be easily moved.

These wheels or rollers may be driven by the motor of the grass-cutting machine in such a way as to assure the movement of the machine without any pushing action by the operator.

In the sitting operator type of grass-cutting machines which, obviously, are of the self-propelled type, the casing is pushed, carried or drawn by the self-propelled grass-cutting machine.

In the grass-cutting machines it is provided a grass-cutting member rotated about an axis perpendicular to the plane on which the grass-cutting machine moves.

Obviously in the foot-operator type of grass-cutting machines only one grass-cutting member is provided, which is mounted at the end of the driving or motor shaft.

In rather rare cases a belt transmission or other transmission members are provided between the motor shaft and the cutting member(s) shaft.

On the contrary, this second transmission to the cutting member or members is usually adopted on the sitting operator type of grass-cutting machines.

The cutting member is frequently formed by a metal rod, fixed at its center to the rotating shaft and sharpened at the two ends which engage the grass stems.

In some cases, the same cutting member consists of three elements, that is a central bar fixed to the rotating shaft and two outside like elements, hinged to the central bar and suitably sharpened in such a way to be effective to cut through the grass.

This approach is to assure a suitable flexibility to the cutting member in the case in which the ends, during the working step, strike against obstacles fixed in the ground.

Alternatively, the cutting member may be formed by a disc which is fixed, at its centre, to the rotating shaft and bearing two or more lugs effective to cut through the grass.

It should be pointed out that the presently commercially available grass-cutting machines may be arranged in such a way as to convey into a suitable vessel the cut grass stems.

To this end, one side or the rear side of the grass-cutting machine casing is so shaped as to provide an evacuating duct effective to evacuate the grass pieces cut by the grass-cutting member.

This latter, furthermore, is shaped in such a way as to assure not only a clean cut through the grass, but also the entraining of the cut grass pieces and the pushing of the cut grass pieces through the duct.

On the casing opening, obviously, there is applied a vessel having such a size as to contain a suitable amount of grass pieces, and being furthermore effective to be easily mounted and removed and being of sufficient strength to assure safety to the operator.

More specifically, in order to collect the cut grass, it is necessary to make the cutting member with such a shape as to eject from the casing the grass pieces.

This need is presently met by shaping its blade in such a way that the edge is followed by a portion parallely extending to the plane on which the grass cutting machine moves, or being slightly upwardly slanted.

Due to this fact the grass pieces which, upon being cut, have to slide on the upper surface of the cutting member, are maintained at an elevated position with respect to the ground (as the portion is flat), and, they are even subjected to an incipient upwardly directed pushing action (because this portion is a slanted one).

On the contrary, the second portion of the outside end of the cutting member is shaped as a solid blade, effective to eject the cut grass pieces.

This pushing effect on the cut grass pieces is generally obtained by providing the second portion of the cutting member with a steep slant, with respect to the plane on which the grass-cutting machine moves, or by forming on the second portion a suitably shaped solid blade.

In this way, the grass pieces, as cut through by the sharpened portion and collected by the first portion of the cutting member, are ejected or pushed by the second portion of the same cutting member.

In fact, this latter is quickly rotated by the motor of the grass-cutting machine, so that the flat vane or blade, formed at the end of the cutting member, originates both a strong mechanical throwing effect on the cut grass pieces, and a strong ventilating effect aiding the conveying of the cut-grass pieces to the provided collecting vessel.

This ventilating effect, however, causes the noise of the grass-cutting machine to remarkably increase, both due to the intense generated air movement and due to the rather large vibrations induced in the cutting member.

The aforesaid drawback is, on the contrary, eliminated by using the particular blade, effective to be applied to grass-cutting machines, according to the present invention.

More specifically, the rotating grass-cutting machine blade according to the present invention comprises, at each end thereof, a projecting member effective to exercise a pushing action on the cut grass pieces and having a discontinuous type of structure in such a way as to reduce to a minimum the ventilating action thereof.

The projecting member may consist of a perforated wall blade or vane or a comb formed by removing material from a suitably upwardly bent portion of the blade.

The projecting member may also consist of a plurality of foils or laminae spaced from one another and parallely extending with respect to the blade longitudinal axis, or it may consist of a plurality of elements fixed side by side in a spaced way perpendicularly to the blade longitudinal axis and having substantially a wing-shaped profile, as airfoils.

In this case the blade may be made of a shaped metal or plastics material net.

In any case, the structures have to be able of assuring a satisfactory mechanical ejecting or pushing effect on the cut grass pieces, thereby reducing to a minimum the air resistance of said cutting member and hence the ventilating effect generated by said cutting member during the rotation thereof.

These and other characteristics, of functional and constructional nature of the rotating grass-cutting machine blade according to the present invention will become more apparent from the figures of the accompanying drawings, where:

FIG. 1 illustrates schematically a grass-cutting machine of the type in which the cut grass pieces are collected at the rear of the grass-cutting machine;

FIG. 2 illustrates a broken away view of the same grass-cutting machine on which an improved blade is mounted;

FIG. 3 illustrates a possible embodiment of an improved blade for a rotating grass-cutting machine;

FIG. 4 illustrates an operating diagram of the grass-cutting machine;

FIGS. 5, 6 and 7 illustrate other possible embodiments for the cutting member, being provided with an added or inserted projecting member;

FIG. 8 illustrates by side and front views the same projecting member illustrated in FIG. 7; and FIG. 9 illustrates a further possible embodiment of the same cutting member, the projecting member being obtained by removing material.

Referring particularly to the number references of the figures of the accompanying drawings, the instant rotating grass-cutting machine comprises a casing (1), provided with wheels (2) or rollers which may be possibly operated by the motor (3).

More specifically, the casing is provided, at a side or rear position thereof, with a discharging port (4) this latter being so arranged that an easily removable cut grass (6) collecting vessel (5) can be fitted thereto.

At the end of the shaft of the motor, a cutting member (7) is fixed, effective to rotate in the casing advancing plane.

This cutting member is substantially formed by a metal bar or rod, having a suitable size, and sharpened at the opposite end portions (8) and (8') thereof.

The same cutting member can be driven, if desired, by means of a belt drive, or other suitable transmission members, located between its shaft and the motor shaft.

At the two ends of the cutting member, and at an opposite position with respect to the sharpened portions (8) and (8'), two projecting members are formed, indicated at (9) and (9'), the projecting members projecting with respect to the plane of the cutting member or bar (7).

These projecting members act to push and eject the cut grass pieces (6) towards the discharging port (4) and, hence, into said vessel (5).

A characterizing feature of said projecting members is that they have a discontinuous type of structure, in such a way as to reduce to a minimum the ventilating effect produced by the conventional solid blades.

More specifically, the projecting members according to the invention can be formed both by removing material from a suitably upwardly bent portion of the cutting member (FIG. 9), or by applying a plurality of spaced wing-shaped structures at the ends of said cutting member (FIGS. 3, 5, 6, 7 and 8) or by providing a plurality of openings.

In the first case, the upwardly bent portion may be lightened by forming therethrough windows of any shapes or size, or the projecting member (9) and (9') may be formed by strips of any shapes, parally extending to one another or perpendicularly to the rotation axis, or even slanted with respect to the axis, the strips being arranged as a comb or, alternatively, they can be not mutually parallel.

In the second case, the projecting member (9) and (9') may consist of a suitably shaped blade (12) made of a metal or plastics material net.

Alternatively, the projecting member may be formed by two superimposed and suitably spaced sheets or laminae (13) (FIGS. 7 and 8) and a series of secta or sectors (10, 10'), parally extending with respect the rotational axis (FIGS. 3 and 5), having a suitably length and, preferably, a wing profile.

In any case, the structures have to be able of assuring a satisfactory mechanical cut grass piece ejecting effect, thereby reducing to a minimum the air resistance of the cutting member and, hence, the ventilation produced by said cutting member during the rotation thereof.

From the above description and the observation of the several figures of the accompanying drawings, the great functionality and ease of use characterizing the rotating grass-cutting machine blade according to the present invention are self evident.

Obviously the grass-cutting machine blade and the making method therefor have been thereinabove described and illustrated by way of an indicative and not limitative example and only to demonstrate the practical making method and the main characteristics of the present invention.

Accordingly, from the above, it should be clear that the rotating grass-cutting machine blade according to the invention, and its component parts may be subjected to several variations and modifications, according to the different making needs and the practical specific use provided for the grass-cutting machine, and it should furthermore be pointed out that they are susceptible to all improvements as suggested by the practical experience.

These variations may relate both to the functional parts described hereinabove, which are characteristics of the present invention, both to the making and/or assembling procedure, without departing from the scope of the present invention.

I claim:

1. In a motor driven rotary blade-type grass cutting machine comprising a wheeled casing, a single cutting blade mounted in the casing and rotating about an axis perpendicular to the plane in which said machine moves, said blade being sharpened along two opposite edges for engagement of the grass during rotation, and evacuating duct in said housing for the ejection of the pieces of cut grass and a container for collecting said cut grass ejected through said duct, the improvement which comprises a perforated vertical wall at the rear of each end of the blade, said wall having a top edge portion and a side edge portion, said perforated wall extending upwardly from said blade adjacent the trailing edges of the blade and defining respective air flow passages to present an effective grass capture area greater than the effective air resistance area presented by said perforated wall in the direction of air movement relative to the blade, said perforated wall aiding and directing the cut grass through said duct into said container and reducing the noise.

* * * * *